(12) United States Patent
Park et al.

(10) Patent No.: US 7,657,903 B2
(45) Date of Patent: Feb. 2, 2010

(54) DISC CARTRIDGE

(75) Inventors: Kyung Chan Park, Seoul (KR); Hyung Jun Lim, Seoul (KR); In Seop Eom, Gyeonggi-do (KR); Ji Duk Kim, Seoul (KR); Jin Yong Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 404 days.

(21) Appl. No.: 10/940,730

(22) Filed: Sep. 15, 2004

(65) Prior Publication Data

US 2005/0097590 A1 May 5, 2005

(30) Foreign Application Priority Data

Sep. 16, 2003 (KR) .................. 10-2003-0064110
Sep. 16, 2003 (KR) .................. 10-2003-0064114
Sep. 16, 2003 (KR) .................. 10-2003-0064118
Sep. 16, 2003 (KR) .................. 10-2003-0064119

(51) Int. Cl.
*G11B 23/03* (2006.01)
(52) U.S. Cl. .................. 720/725; 369/291.1
(58) Field of Classification Search ............ 720/725, 720/735; 72/725, 735; 369/291.1; 360/133
See application file for complete search history.

(56) References Cited

U.S. PATENT DOCUMENTS

| 4,573,096 | A | * | 2/1986 | Gerfast ................ 360/133 |
| 5,268,808 | A | | 12/1993 | Childers |
| 5,475,674 | A | * | 12/1995 | Yamashita et al. ........ 720/735 |
| 5,898,664 | A | | 4/1999 | Kikuchi et al. |
| 6,044,058 | A | | 3/2000 | Miyazaki et al. |
| 6,078,562 | A | * | 6/2000 | Kikuchi ................ 720/734 |
| 6,269,074 | B1 | * | 7/2001 | Funawatari et al. ....... 720/735 |
| 6,763,521 | B2 | * | 7/2004 | Thayne ................ 720/719 |
| 6,948,180 | B2 | * | 9/2005 | Hayashi ................ 720/728 |
| 7,146,625 | B2 | * | 12/2006 | Eum et al. ............. 720/742 |
| 7,340,753 | B2 | | 3/2008 | Inata et al. |
| 2002/0012316 | A1 | | 1/2002 | Inoue et al. |
| 2003/0112738 | A1 | | 6/2003 | Takizawa et al. |
| 2003/0156533 | A1 | * | 8/2003 | Yim et al. ............. 369/291 |
| 2003/0179696 | A1 | | 9/2003 | Eum et al. |
| 2003/0235144 | A1 | * | 12/2003 | Eum et al. ............. 369/291 |
| 2004/0052204 | A1 | | 3/2004 | Okazawa et al. |
| 2005/0060737 | A1 | | 3/2005 | Kang et al. |

FOREIGN PATENT DOCUMENTS

| CN | 1239572 A | 12/1999 |
| EP | 0 602 731 A2 | 6/1994 |
| EP | 0 772 196 A2 | 5/1997 |
| EP | 0 929 070 A2 | 7/1999 |
| JP | 10-144039 A | 5/1998 |

(Continued)

*Primary Examiner*—Angel A. Castro
(74) *Attorney, Agent, or Firm*—Birch, Stewart, Kolasch & Birch, LLP

(57) ABSTRACT

A disc cartridge is provided. The disc cartridge includes: a lower housing having a window for allowing a recorder or reader to access to a read-out surface of a disc; and an upper housing coupled to the lower housing to ejectably receive the disc between the lower housing and the upper housing, and having at least a portion rotatable up and down with respect to one side of the lower housing until the disc can be ejected.

14 Claims, 11 Drawing Sheets

FOREIGN PATENT DOCUMENTS

| | | |
|---|---|---|
| JP | 10-269742 A | 10/1998 |
| JP | 2000-113630 A | 4/2000 |
| JP | 2000-260153 A | 9/2000 |
| JP | 2001-189068 A | 7/2001 |
| JP | 2001-332058 A | 11/2001 |
| JP | 2002-25215 A | 1/2002 |
| JP | 2003-115182 A | 4/2003 |
| WO | WO-03/041076 A1 | 5/2003 |
| WO | WO-03/079356 A1 | 9/2003 |

\* cited by examiner

DISC CARTRIDGE

This application claims the benefit of the Korean Application No. P03-64110 filed on Sep. 16, 2003, No. P03-64114 filed on Sep. 16, 2003, No. P03-64118 filed on Sep. 16, 2003 and No. P03-64119 filed on Sep. 16, 2003, which is hereby incorporated by reference.

BACKGROUND OF THE INVENTION

1. Field of the Invention

The present invention relates to a disc cartridge, and more particularly, to a disc cartridge that permits a disc to be easily ejected therefrom and enables an operation with being inserted into a disc recorder or a reader in a state that the disc is received therein.

2. Discussion of the Related Art

Generally, an optical disc records information on its surface by using a laser beam. The optical disc is recently highlighted as a large capacity of storage medium. As the optical disc, there are Compact Disc (CD), Digital Versatile Disc (DVD), Laser Disc (LD) and the like. A group of Blue-Ray Disc and a group of Advanced Optical Disc group are being competed as a recent next-generation optical disc storage medium.

"Blu-Ray Disc" is aimed at a High Definition Video Disc Recorder (HDVDR), and is a next-generation optical disc storage medium using a blu-ray laser beam capable of recording a larger amount of data than a conventional red laser beam. Accordingly, the Blu-Ray Disc has a data storage capacity of 27 Gigabytes corresponding to a thirteen-hour amount of video data in a general cinema or a two-hour amount of video data in a HD television. The Blu-Ray Disc is being much concerned as a new storage medium for solving a drawback of a conventional DVD.

Meanwhile, a disc is received and kept in a separate case so as to safely protect a read-out surface of the disc from an external dust and scratch when the disc is kept and carried. Only when the disc is inserted into the disc recorder and reader, the disc is put out of the case for use. Further, the read-out surface can be easily damaged as the disc has an increasing record density and has a thin protection layer at the read-out surface. Recently, the cartridge with the disc being received is wholly inserted into the disc recorder and reader so as to prevent the read-out surface from being damaged while the disc is carried and inserted into the disc recorder or reader.

As described above, the recent disc recorder and reader is designed to receive only the disc or wholly receive the cartridge with the disc being received, according to its usage and purpose. For one example, since a portable disc recorder and reader should have a small size, it is designed to receive only the disc rather than to wholly receive the cartridge. However, the non-portable disc recorder and reader having a large size is designed to wholly receive the cartridge to safely protect the disc. Accordingly, in case where the disc received within the cartridge is used for the portable disc recorder and reader capable of receiving only the disc, the disc should be separated from the cartridge.

However, a conventional blu-ray disc cartridge is used with a disc 1 being mounted within the cartridge as shown in FIGS. 1 to 3. In more detail, the cartridge includes a lower housing 2 having a window 2a for allowing an external unit such as a disc recorder and reader to access a read-out surface (not shown) of the disc 1; a shutter for opening and closing the window 2a; a rotating wheel 4 for operating the shutter 3; a shutter latch 8 for maintaining a closed state of the shutter 3; and an upper housing having an opening 3a for exposing a label surface 1a of the disc 1. The upper housing 3 and the lower housing 2 are firmly fixed by a plurality of screws 6.

Accordingly, when the disc 1 is ejected from the cartridge, the plurality of screws 6 fixing the upper housing 3 and the lower housing 2 should be unscrewed, thereby causing an inconvenience. Further, in order to safely keep the disc 1 after the use of the disc 1, the disc 1 is again inserted into the cartridge and the screws 6 are screwed to firmly fix the upper housing 3 and the lower housing 2, thereby causing an inconvenience. Accordingly, the cartridge of FIGS. 1 to 3 cannot conveniently use the different disc recorder or reader receiving only the disc or wholly receiving the cartridge as described above.

SUMMARY OF THE INVENTION

Accordingly, the present invention is directed to a disc cartridge that substantially obviates one or more problems due to limitations and disadvantages of the related art.

An object of the present invention is to provide a disc cartridge having an improved structure such that a disc can be easily ejected from and installed in the cartridge.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a disc cartridge including: a lower housing having a window for allowing a recorder or reader to access to a read-out surface of a disc; and an upper housing coupled to the lower housing to ejectably receive the disc between the lower housing and the upper housing, and having at least a portion rotatable up and down with respect to one side of the lower housing until the disc can be ejected.

The upper housing has an opening to expose a portion of a label surface of the disc, and the opening has a size of preventing an ejection of the disc.

The upper housing is integrally formed, and is wholly rotated up and down centering on one side of the lower housing.

The upper housing is integrated with the lower housing, and the upper housing and the lower housing have a connection portion at one-sides to be folded or unfolded.

The upper housing is hinge-coupled to the one side of the lower housing.

The upper housing includes: a fixing part fixed to the lower housing, and covering a portion of the label surface of the disc; and a moving part coupled to one side of the lower housing, and rotating centering on the one side of the lower housing while covering a portion of the label surface of the disc to fix the disc, or securing a space for allowing an ejection of the disc.

The upper housing includes an opening for exposing the label surface of the disc when the moving part and the fixing part covers a portion of the label surface of the disc to fix the disc, and the opening is provided by respectively providing a cut-away portion at facing surfaces of the moving part and the fixing part.

The moving part is integrated with the lower housing, and the moving part and the lower housing are folded or unfolded at their connection portion.

The moving part is hinge-coupled to the one side of the lower housing.

The disc cartridge further includes a locking member for preventing the upper and lower housings, which are connected to each other with the disc being received therebetween, from being freely separated from each other.

The upper housing includes: a projection provided at the upper or lower housing; and a groove provided at the upper or lower housing, for receiving the projection when the upper and lower housings are coupled with each other.

The disc cartridge further includes a locking member for preventing the moving part from being freely rotated when the moving part covers the portion of the label surface.

The locking member includes: a projection provided at any one of the moving part and the lower housing; and a groove provided at the other one of the moving part and the lower housing, for receiving the projection when the moving part covers the portion of the label surface.

In another aspect of the present invention, there is provided a disc cartridge including: a lower housing having a window for allowing a recorder or reader to access to a read-out surface of a disc; an upper housing coupled to the lower housing to receive the disc between the upper housing and the lower housing, and having an opening having a larger size than the disc; and a plurality of disc locks movably provided at a periphery of the opening, for covering a portion of a label surface of the disc to fix the disc or securing a space for allowing an ejection of the disc through the opening.

The disc lock includes: a plurality of cut-away portions provided at the upper housing, for communicating with the opening along a circumference of the opening; and a moving member disposed within the cut-away portion, and sliding or rotating in a horizontal direction while holding or unholding the portion of the label surface of the disc.

The moving member is coupled to the upper housing to slide in a radius direction of the disc.

The moving member is coupled to the lower housing to rotate in the horizontal direction within the cut-away portion.

The moving member has a self-lubricative material layer provided at its lower surface to reduce a rubbing or an abrasion when the moving member is in contact with the label surface of the disc.

The disc cartridge further includes a locking member for preventing a free movement of the moving member when the moving member covers the portion of the label surface of the disc.

The locking member includes: a projection provided at any one of the moving member and the upper housing; and a groove provided at the other one of the moving member and the upper housing, for receiving the projection when the moving member cover the portion of the label surface.

In a further aspect of the present invention, there is provided a disc cartridge including: a lower housing having a window for allowing a recorder or reader to access to a read-out surface of a disc; an upper housing coupled to the lower housing, for providing a space between the lower housing and the upper housing; and a disc tray provided between the upper and lower housings to be slid and ejected in a horizontal direction to the external, and having a window corresponding to the window and loading the disc thereon.

The upper housing has an opening to expose a portion of a label surface of a disc, and the opening has a size of preventing an ejection of the disc.

The tray includes: a receiving part for receiving the disc; and a handgrip extended from a side surface of the receiving part, and allowing holding at the external of the upper and lower housings.

The upper and lower housings have slots at their side surfaces to allow the disc tray to be ejected in a horizontal direction.

The disc cartridge further includes a locking member for preventing the disc tray from being freely ejected from the upper and lower housings when the disc tray is inserted between the upper and lower housings.

The locking member includes: a projection provided at any one of the disc tray and the upper housing; and a groove provided at the other one of the disc tray and the upper housing, for receiving the projection when the disc tray is completely inserted between the upper and lower housings.

The locking member includes: a projection provided at any one of the disc tray and the lower housing; and a groove provided at the other one of the disc tray and the lower housing, for receiving the projection when the disc tray is completely inserted between the upper and lower housings.

In a further another aspect of the present invention, there is provided a disc cartridge including: a lower housing having a window for allowing a recorder or reader to access to a read-out surface of a disc; and an upper housing coupled to the lower housing by a coupling member, and moving in a horizontal direction to allow the disc to be ejectably received between the upper housing and the lower housing while being coupled to or separated from the lower housing.

The upper housing has an opening to expose a portion of a label surface of a disc, and the opening has a size of preventing an ejection of the disc.

The coupling member includes: a coupling projection provided at any one of the upper housing and the lower housing; and a coupling groove provided at the other one of the upper housing and the lower housing, for receiving the coupling projection when the upper housing and the lower housing are coupled with each other.

The coupling member is disposed along a circumference of the disc.

The coupling projection and the coupling groove are respectively disposed to have a curve shape at the circumference of the disc such that the upper housing is rotated in a horizontal direction with respect to the lower housing for coupling or separation.

Each of the coupling projections has an inclined top surface and each of the coupling grooves has an inclined bottom surface such that the upper housing is vertically moved a little toward or backward of the lower housing in order to assemble the upper housing and the lower housing or separate the upper housing from the lower housing.

The disc cartridge further includes a locking member for preventing the upper housing from being freely moved with respect to the lower housing in a state where the upper and lower housings are coupled with each other.

The locking member includes: a projection provided at any one of the upper housing and the lower housing; and a groove provided at the other one of the upper housing and the lower housing, for receiving the coupling projection when the upper housing and the lower housing are coupled with each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment and its Modified Example

Figure 1:
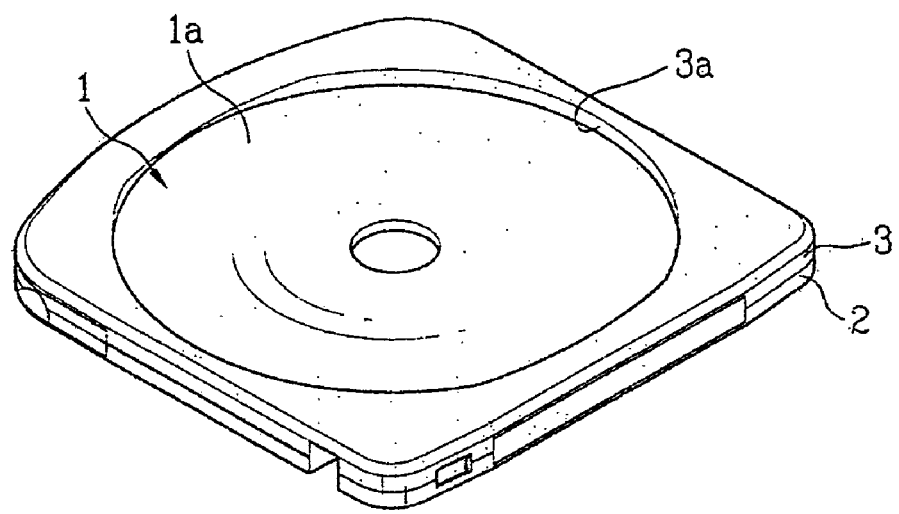
FIG. 1 is a perspective view illustrating a conventional disc cartridge.
Figure 2:
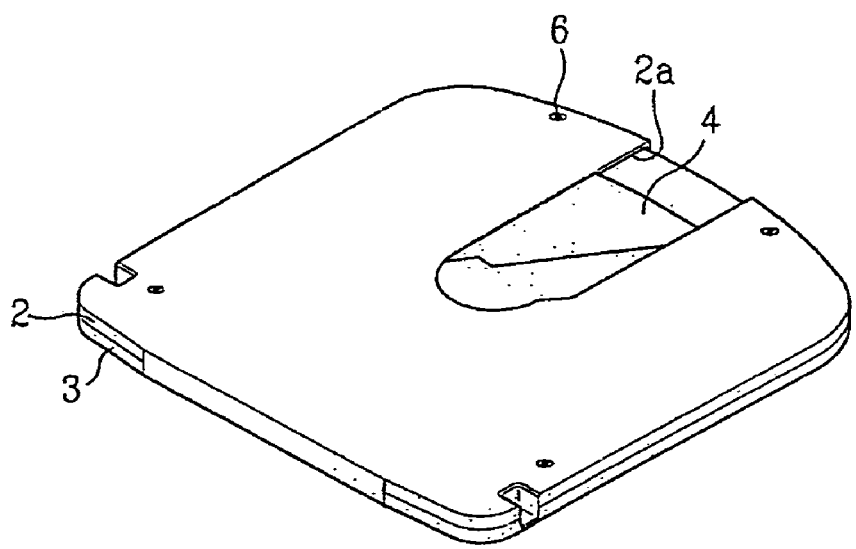
FIG. 2 is a perspective view illustrating a rear surface of a disc cartridge of FIG. 1.
Figure 3:
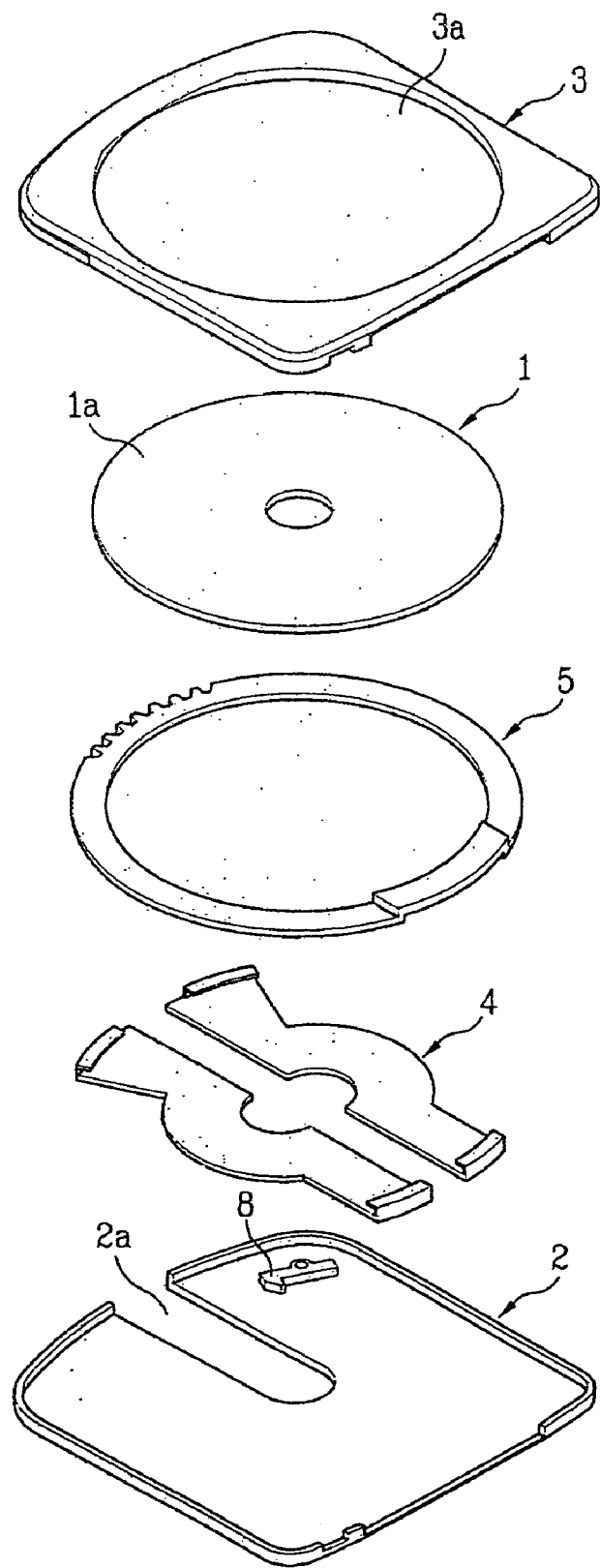
FIG. 3 is a disassembled perspective view illustrating a simple internal construction of a disc cartridge of FIG. 1.
Figure 4:
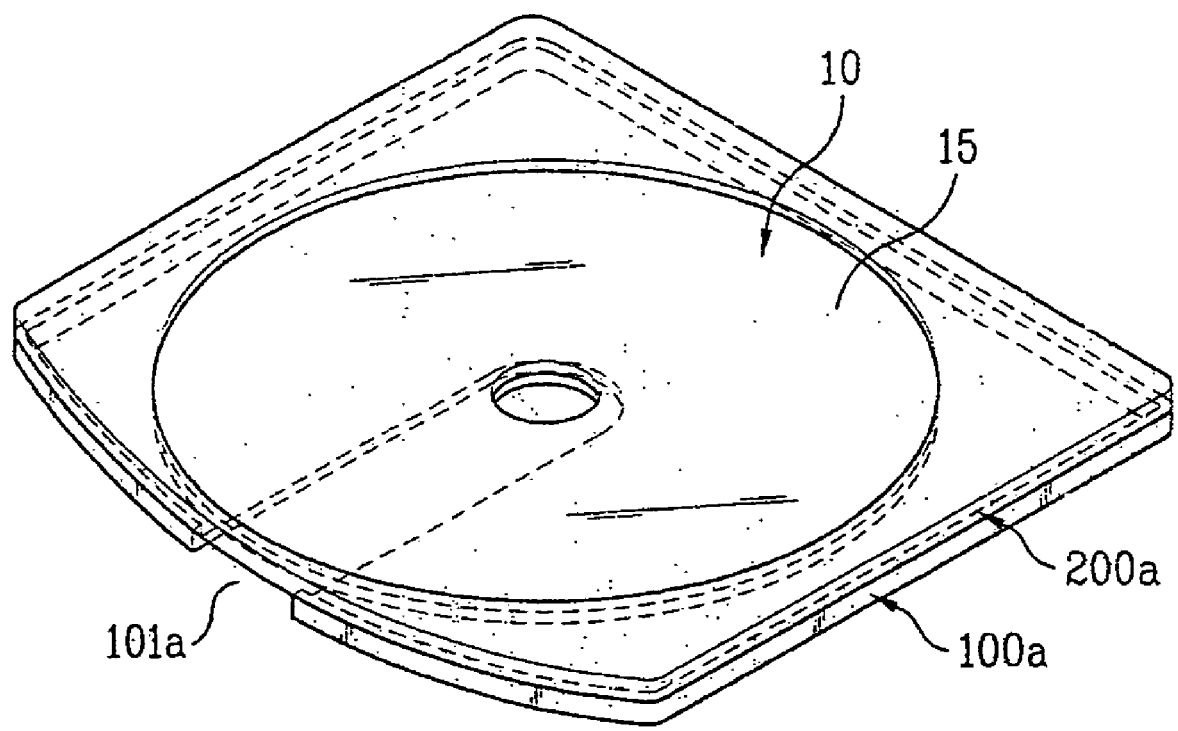
FIG. 4 is a perspective view illustrating a disc cartridge according to a first embodiment of the present invention.
Figure 5A:
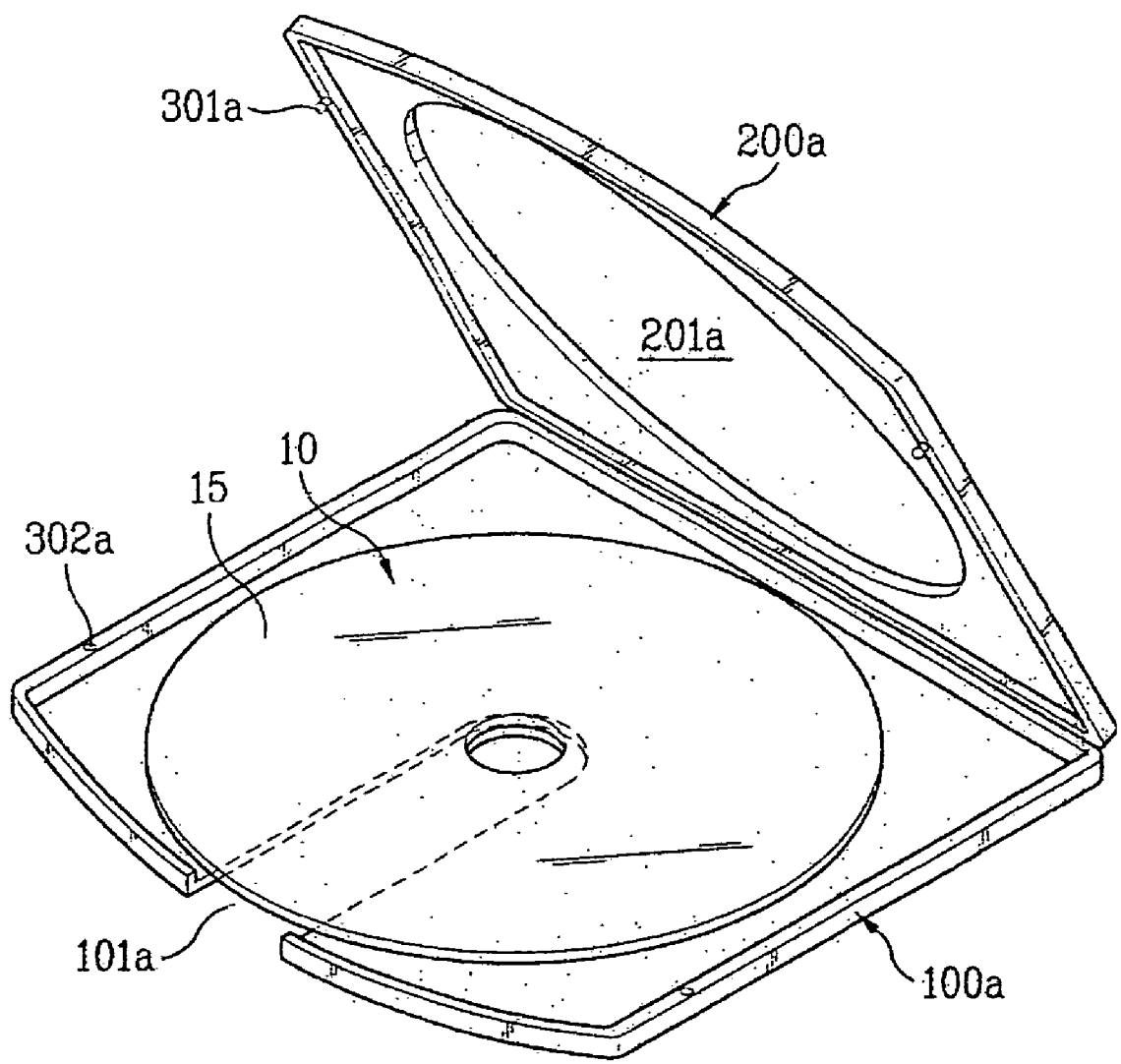
FIGS. 5A and 5B are perspective views illustrating a disc cartridge of FIG. 4 opened.
Figure 5B:
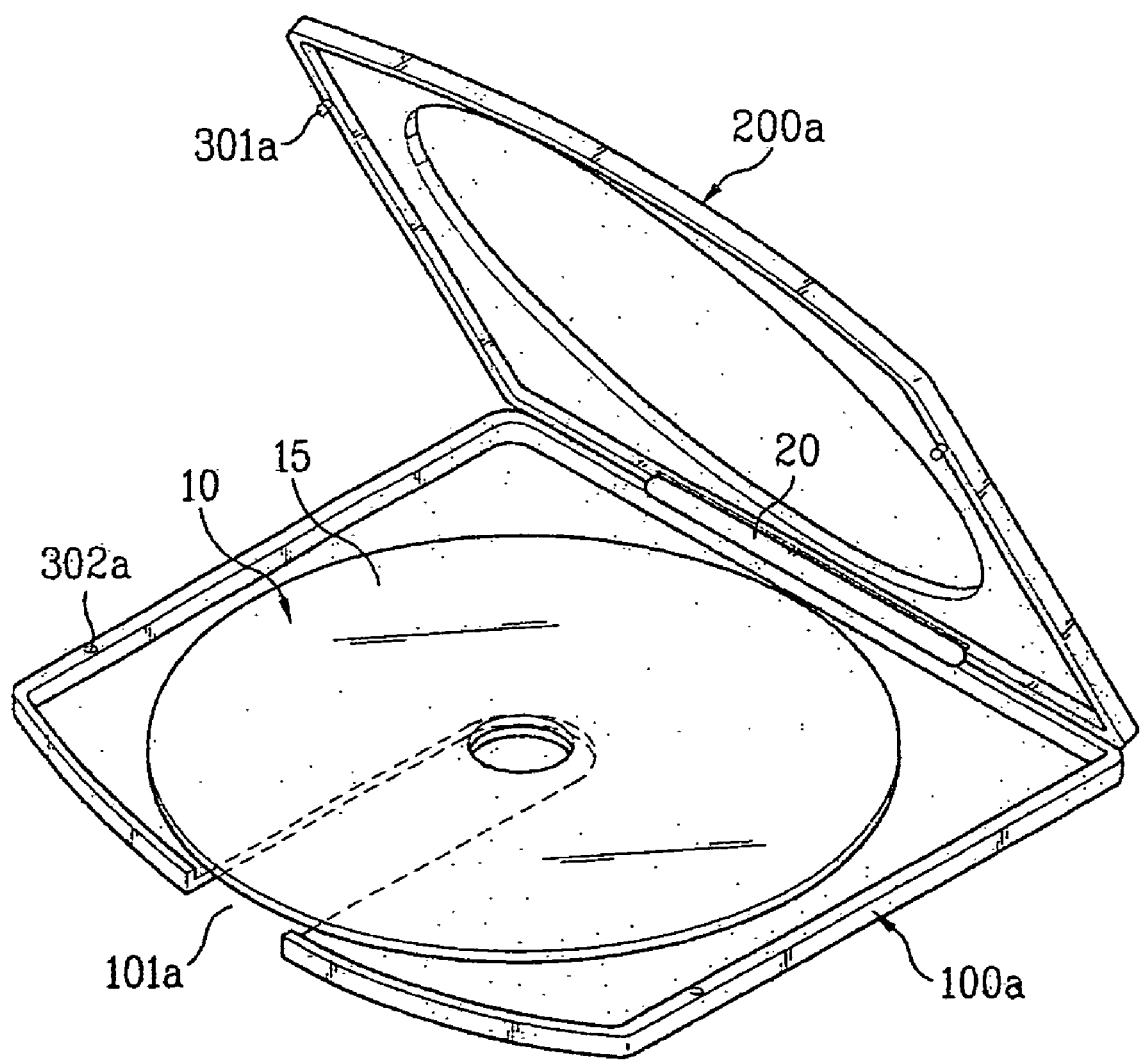
Figure 6:
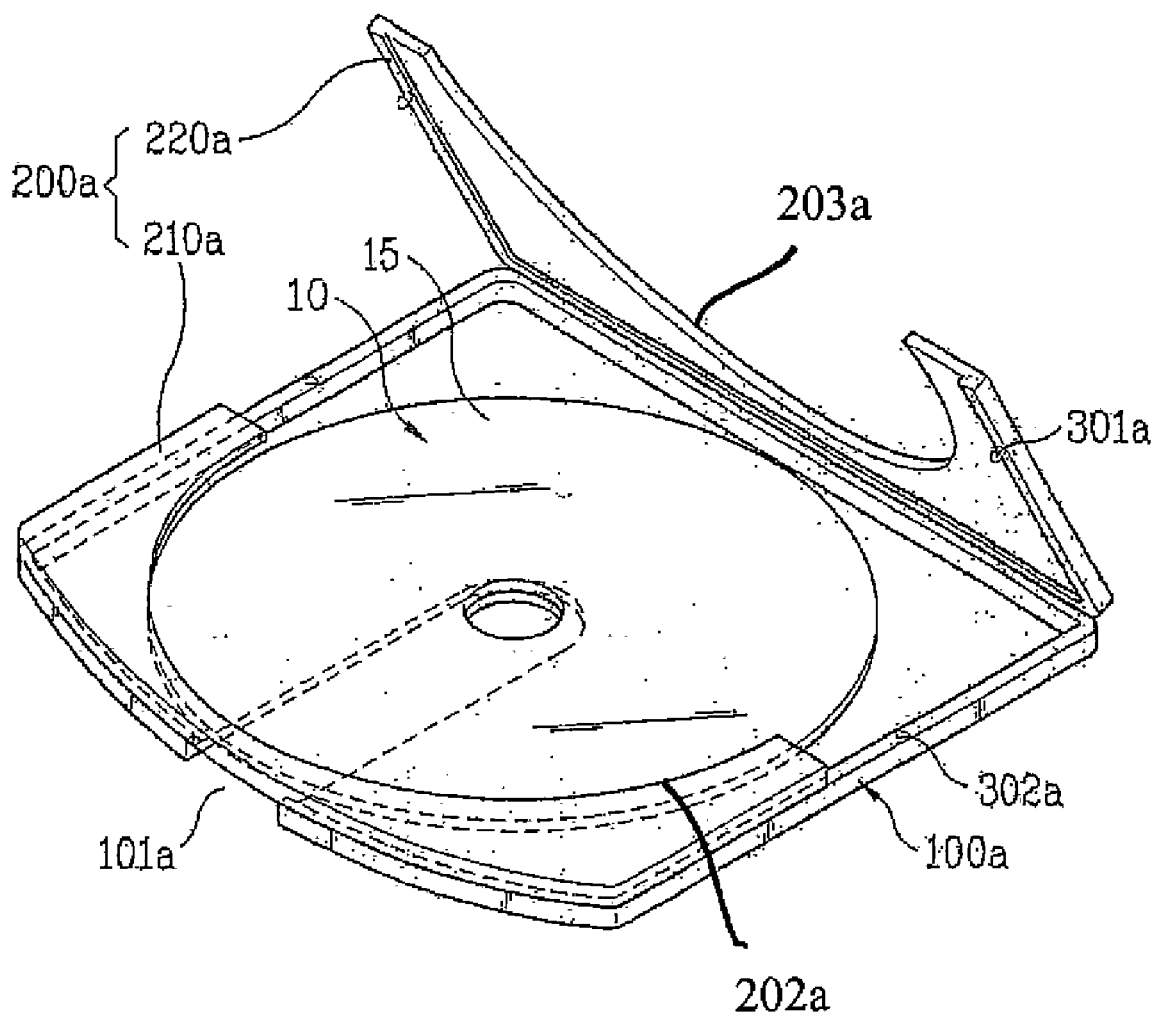
FIG. 6 is a perspective view illustrating a disc cartridge according to a modified example of a first embodiment of the present invention.

FIG. 4 is a perspective view illustrating a disc cartridge according to a first embodiment of the present invention, FIGS. 5A and 5B are perspective views illustrating a disc cartridge of FIG. 4 opened, and FIG. 6 is a perspective view illustrating a disc cartridge according to a modified example of a first embodiment of the present invention.

As shown in FIG. 4, the disc cartridge includes a lower housing 100a, and an upper housing 200a coupled with the lower housing 100a. The lower housing 100a includes a window 101a for allowing a disc recorder or reader to access a read-out surface (not shown) of a disc 10. Additionally, the upper housing 200a is coupled with one side of the lower housing 100a such that the disc 10 can be ejectably received between the upper housing 200a and the lower housing 100a. As shown in FIGS. 5A and 5B, the upper housing 200a can wholly rotate up and down with respect to one side of the lower housing 100a to cover and fix the disc 10 received within the cartridge, or can secure a space for allowing the disc 10 to be ejected from the cartridge.

The upper housing 200a is rotatably connected to the lower housing 100a at their one-sides in various methods. For example, as shown in FIG. 5A, the upper housing 200a is integrated with the lower housing 100a, but the upper housing 200a and the lower housing 100a can have a flexible connection portion at their one-sides to be folded or unfolded. For another example, as shown in FIG. 5B, the upper housing 200a can be hinge-coupled with the lower housing 100a at their one-sides. In this case, a hinge shaft 20 is installed to pass through the connection portion of the upper housing 200a and the lower housing 100a. Or, the upper housing 200a and the lower housing 100a can be hinge-coupled, through a method using a short pivot and a groove for allowing the pivot to be fitted thereinto. The short pivot is provided at any one of the upper housing 200a and the lower housing 100a, and the groove is provided at the other one of the upper housing 200a and the lower housing 100a.

The upper housing 200a can have an opening 201a. The opening 201a exposes a portion of a label surface 15 such that a user can easily identify the label surface 15 of the disc 10. However, the disc 10 does not pass through the opening 201a due to a smaller size of the opening 201a than that of the disc 10. However, the disc cartridge according to the first embodiment of the present invention is not limited to this. For example, the upper housing 200a may not also have the opening 201a to entirely cover the label surface 15 of the disc 10.

The disc 10 should be stably received within the cartridge. For this, it is desirable that the upper housing 200a is not freely rotated when the upper housing 200a is coupled with the lower housing 100a as shown in FIG. 4. Accordingly, it is desirable that the disc cartridge has a locking member for preventing the rotation of the upper housing 200a when the upper housing 200a is coupled with the lower housing 100a.

The locking member is desirably disposed to sufficiently space apart from a rotational center of the upper housing 200a. For example, as shown in FIGS. 5A and 5B, the locking member is comprised of a projection 301a and a groove 302a. For example, as shown in FIG. 5A, the projection 301a is projected from the upper housing 200a, and the groove 302a is provided at the lower housing 100a. However, the projection 301a may be also projected from the lower housing 100a, and the groove 302a may be also provided at the upper housing 200a. Here, the projection 301a and the groove 302a are disposed along a circumference of the disc 10 not to be interfered with the disc 10, or are disposed along circumferences of the upper housing 200a and the lower housing 100a as shown in FIGS. 5A and 5B.

If the locking member is provided, the projection 301a is maintained and fixed into the groove 302a by snap fitting when the upper housing 200a is coupled with the lower housing 100a as shown in FIG. 4. Therefore, the upper housing 200a is not freely separated from the lower housing 100a to allow the disc 10 to be stably received within the cartridge. Alternatively, though being not illustrated, a press type button or a slide type button using a spring and a hook, which is being widely used as the locking member, may be also adopted.

Meanwhile, since the window 101a of the lower housing 100a is closed by a shutter (not shown) as aforementioned, the read-out surface of the disc 10 received within the cartridge is safely protected from the external. To the contrary, the label surface opposite to the read-out surface of the disc 10 is exposed to the external through the opening 201a provided at the upper housing 200a. Accordingly, the user can confirm information on contents of the disc 10, which is printed on the label surface 15 of the disc 10, and easily search for a desired disc 10 without opening several cartridges one by one.

When the disc recorder or reader wholly receiving the cartridge is used, the inventive disc cartridge is wholly inserted into the disc recorder or reader as shown in FIG. 4. Accordingly, the recorder or the reader records or reads data from the read-out surface of the disc 10 through the window 101a with the shutter being opened. To the contrary, when the disc recorder or reader receiving only the disc is used, the disc 10 should be ejected from the inventive disc cartridge. Accordingly, if the upper housing 200a is rotated up and down with respect to the one-side of the lower housing 100a as shown in FIGS. 5A and 5B, the space is secured for allowing the disc 10 to be ejected from the cartridge. Therefore, the user can easily separate the disc 10 from the cartridge. Of course, after the use of the ejected disc 10, the disc 10 is mounted at the cartridge and then, the upper housing 200a is rotated in an opposite direction to the above direction to fix the disc 10.

In the above description, an example of the disc cartridge in which the upper housing 200a is wholly rotated with respect to the lower housing 100a in a vertical direction is described. However, the disc cartridge according to the first embodiment of the present invention is not limited to this. For example, a portion of the upper housing 200a can be rotated with respect to the lower housing 100a in a vertical direction. This modified example is illustrated in FIG. 6. Hereinafter, the modified example of the first embodiment is in more detail described with reference to FIG. 6.

Referring to FIG. 6, the upper housing 200a is comprised of a fixing part 210a fixed to the lower housing 100a, and a moving part 220a rotatably coupled to the lower housing 100a. The fixing part 210a covers a portion of the label surface 15 of the disc 10 to fix the disc 10 together with the moving part 220a when the moving part 220a is not rotated. Additionally, the moving part 220a is rotatably coupled with the one-side of the lower housing 100a. For this, the moving part 220a is, for example, integrated with the lower housing 100a as shown in FIG. 6, but the moving part 220a and the lower housing 100a can have a flexible connection portion at their one-sides to be folded or unfolded. However, the present invention is not limited to this. For example, though being not illustrated, the moving part 220a may be also coupled with the one-side of the lower housing 100a by the hinge. As described above, the moving part 220a can be rotated centering on the one-side of the lower housing 100a. Accordingly, the moving part 220a can cover a portion of the label surface 15 of the disc 10 to fix the disc 10, or secure the space for allowing the disc 10 to be ejected.

The upper housing 200a can have the opening for exposing the label surface 15 of the disc 10. The opening is defined by a space provided between the moving part 220a and the fixing part 210a. For this, the fixing part 210a and the moving part 220a respectively have cut-away portions 202a and 203a at their facing surfaces. Accordingly, when the moving part 220a is coupled with the lower housing 100a, one opening is provided by two cut-away portions 202a and 203a. Therefore, the user can easily read the label surface 15 of the disc 10 through the opening. Of course, the opening has a size of preventing a self-ejection of the disc 10.

The disc cartridge has the locking member for preventing the moving part 220a from being freely separated from the lower housing 100a. The locking member is disposed to sufficiently space apart from the rotational center of the moving part 220a. For example, the locking member is comprised of the projection 301a and the groove 302a as shown in FIG. 6. Here, the projection 301a is projected from the moving part 220a, and the groove 302a is provided at the lower housing 100a. However, the present invention is not limited to this. That is, the projection 301a is provided at the lower housing 100a, and the groove 302a is projected from the moving part 220a. Here, the projection 301a and the groove 302a are disposed along the circumference of the disc 10 not to be interfered with the disc 10, or are disposed along the circumference of the moving part 220a and the lower housing 100a.

The moving part 220a and the fixing part 210a are mutually coupled when the moving part 220a is coupled to the lower housing 100a. In this case, the locking member can be also provided at each of the moving part 220a and the fixing part 210a. However, the present invention is not limited to this, and the moving part 220a and the fixing part 210a can be disposed to space apart from each other.

As described above, the disc cartridge according to the modified example of the present invention fixes a portion (fixing part) of the upper housing 200a coupled to the lower housing 100a, and opens and closes another portion (moving part) of the upper housing 200a to attach and detach the disc 10. Therefore, mobile portions can be minimized in number. Accordingly, a deformation of the cartridge can be wholly prevented and a total rigidity of the cartridge can be continuously maintained even when the disc 10 is ejected from the cartridge. Accordingly, a destruction of the cartridge can be minimized even in case that an external impact is generated while the disc 10 is detached.

As described above, the disc cartridge according to the first embodiment and its modified example of the present invention can be easily opened and closed. Accordingly, the disc cartridge has a structure in which the disc 10 can be ejected from or be easily mounted within the cartridge. Therefore, the inventive disc cartridge provides a convenience in that it can be easily adapted to the disc recorder and reader receiving only the disc as well as the disc recorder and reader receiving a whole of the cartridge.

Second Embodiment and its Modified Example

Figure 7:
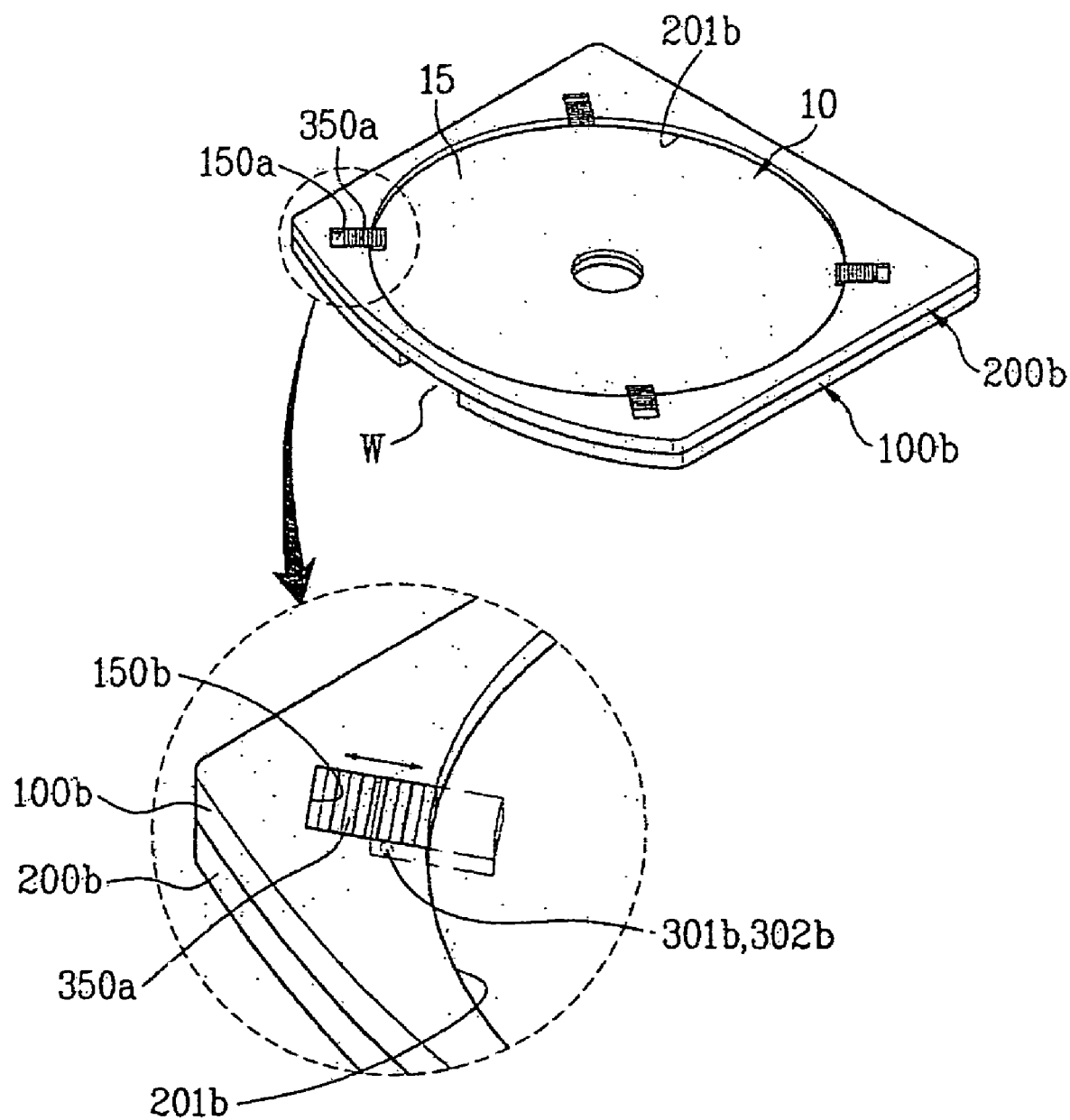
FIG. 7 is a perspective view illustrating a disc cartridge according to a second embodiment of the present invention.
Figure 8:
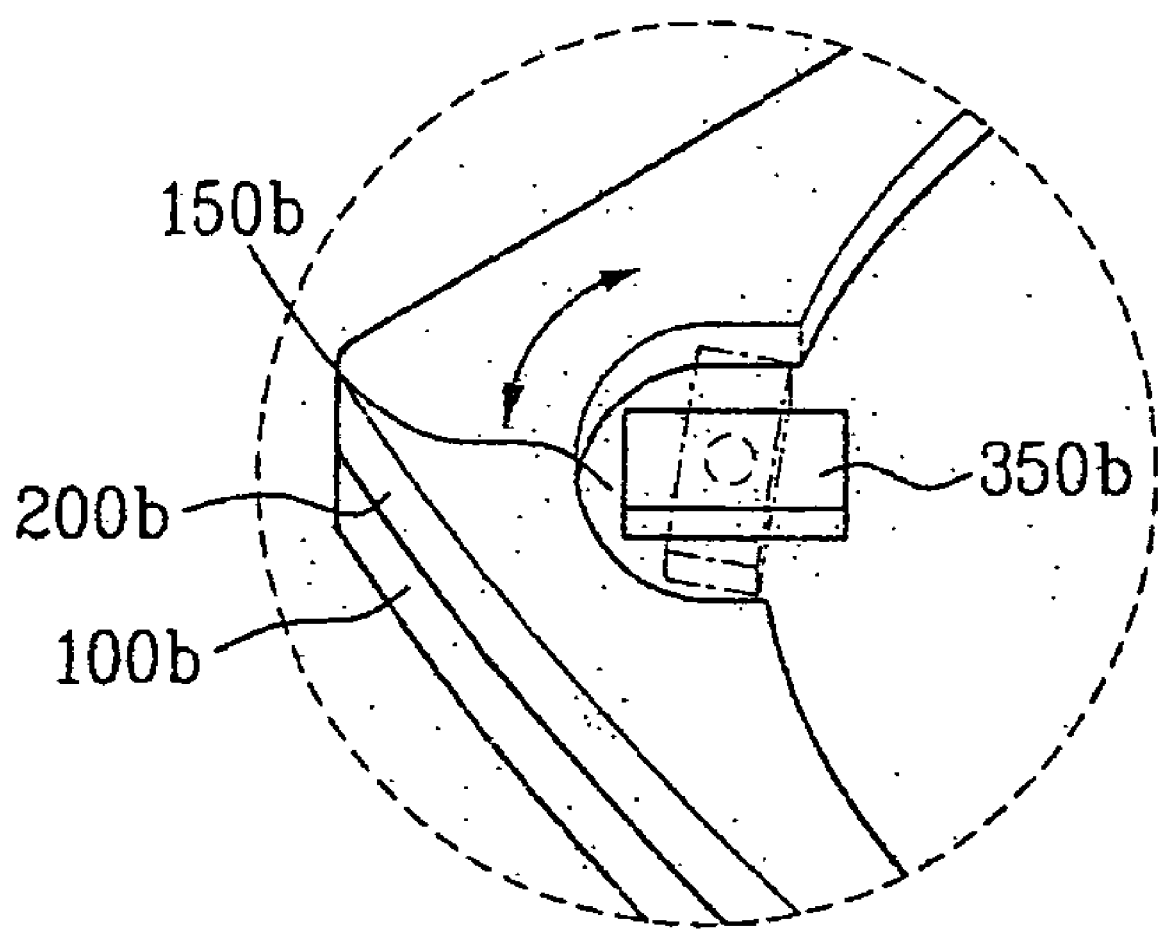
FIG. 8 is a partial perspective view illustrating a disc lock of a disc cartridge according to a modified example of a second embodiment of the present invention.

FIG. 7 is a perspective view illustrating a disc cartridge according to a second embodiment of the present invention, and FIG. 8 is a partial perspective view illustrating a disc lock of a disc cartridge according to a modified example of a second embodiment of the present invention. Hereinafter, the second embodiment and its modified example are described with reference to FIGS. 7 and 8.

Referring to FIG. 7, the disc cartridge according to the second embodiment includes a lower housing 100b having a window 101b for allowing an access of a disc recorder or reader; an upper housing 200b coupled with the lower housing 100b; and a plurality of disc locks movably provided at a periphery of the opening 201b. Here, the opening 201b provided at the upper housing 200b exposes a label surface 15 of the disc 10, which is provided between the upper housing 200b and the lower housing 100b, to the external. The opening 201b has a size larger than a size of the disc 10. Accordingly, the disc 10 can be ejected from or mounted within the cartridge through the opening 201b.

In the disc cartridge according to the second embodiment of the present invention, the opening 201b has a larger size than the disc 10. Therefore, the disc lock moves in a horizontal direction with respect to the cartridge, while holding and fixing or unholding the disc 10. As shown in FIG. 7, the disc lock includes a cut-away portion 150a and a moving member 350a. The cut-away portion 150a is provided in plurality along the circumference of the opening 201b to communicate with the opening 201b. The cut-away portion 150a has a rectangular shape having a long length in a radius direction of the disc 10, for example. The moving member 350a is disposed within the cut-away portion 150a. The moving member 350a is coupled to the upper housing 200b such that it can slide and move in a length direction of the cut-away portion 150a, that is, in the radius direction of the disc 10.

For this, the moving member 350a has a long guide protrusion at both sides and the cut-away portion 150a has a long guide channel for allowing the guide protrusion to be inserted and slid therealong, for example. Of course, the guide protrusion and the guide channel can be provided at an opposite position. Accordingly, the moving member 350a can move in the radius direction of the disc 10 in a state where it is fitted into the cut-away portion 150a. This structure can be fully embodied through the above description, and therefore a detailed illustration is omitted for the guide protrusion and the guide channel.

As shown in FIG. 7, the disc lock allows the moving member 350a to be moved in the radius direction of the disc and be fitted into the cut-away portion 150a to cover a portion of the label surface 15 of the disc 10 and fix the disc, or to secure a space for allowing the ejection of the disc 10 through the opening 201b. The disc lock is preferably disposed in plurality to be at an equal interval at a periphery of the disc 10 such that the disc 10 can be stably fixed. Further, the disc lock preferably has a construction in which when any one of moving members 350a is moved for user's convenience, remaining moving members 350a can move in the same direction.

The disc cartridge according to the second embodiment of the present invention also includes a locking member for preventing a free movement of the moving member 350a when the moving member 350a fixes the disc 10. The locking member includes a projection 301b and a groove 302b. For example, the projection 301b is projected form both side surfaces of the moving member 350a, and the groove 302b are provided at both side surfaces of the cut-away portion 150a. To the contrary, the projection 301b can be provided at the cut-away portion 150a, and the groove 302b can be provided at the moving member 350a.

In the locking member, when the moving member 350a holds the disc 10, the projection 301b maintains a state where the projection is inserted into the groove 302b. Therefore, the moving member 350a does not freely moved, thereby stably receiving the disc 10 within the cartridge. The projection 301b and the groove 302b functions to prevent the moving member 350a from fully escaping from the cut-away portion 150a. Alternatively, though being not illustrated, a press type button or a slide type button using a spring and a hook, which is being widely used as the locking member, may be also adopted.

The moving member 350a is preferably stably maintained without the free movement in a position of unholding the disc 10 as well as in a position of holding the disc 10. Accordingly, the groove 302b is preferably provided in a position of receiving the projection 301b when the moving member 350a is fully inserted into the cut-away portion 150a not to unhold the disc 10 as well as in a position of receiving the projection 301b when the moving member 350a covers the portion of the label surface 15 of the disc 10. Accordingly, the moving member 350a can be stably fixed in the positions of holding or unholding the disc 10 by the snap fitting.

As described above, the moving member 350a of the disc lock moves while holding or unholding the label surface 15 of the disc 10. Accordingly, a lower surface of the moving member 350a is in many contacts with the label surface of the disc 10. Therefore, the lower surface of the moving member 350a and the label surface of the disc 10 can be easily worn away. In order to reduce the rubbing and abrasion caused when the label surface 15 and the lower surface of the moving member 350a are contacted with each other, a self-lubricative material layer is preferably provided on the lower surface of the moving member 350a. Here, the self-lubricative material layer can be coated on or separately adhered to the lower surface of the moving member 350a.

In the meanwhile, the above example is described in which the rectangular moving member 350a moves in the radius direction of the disc 10 while holding and fixing the disc 10 or securing the space for allowing the ejection of the disc 10. However, the present invention is not limited to this. That is, as shown in FIG. 8, the moving member 350b can rotate in the horizontal direction while holding and fixing or unholding the disc 10. For this, the cut-away portion 150b is formed to have approximately a semi-circular shape, and the moving member 350b is coupled to the lower housing 100b to be disposed and rotated within the cut-away portion 150b. Here, the moving member 350b has a long shape, for example, a rectangular or oblong shape. If the moving member 350b is disposed to have a long axis directing to the disc 10 as shown by a solid line of FIG. 8, the moving member 350b covers the portion of the label surface 15 of the disc 10 to hold the disc 10. If the moving member 350b is disposed to have a short axis directing to the disc 10 as shown by a dotted line of FIG. 8, the moving member 350b unholds the disc 10. In the modified example of the second embodiment, the moving member 350b rotates while holding and fixing the disc 10, or secures the space for allowing the ejection of the disc 10. Since other constructions of the modified example of the second embodiment are the same as those referring to FIG. 7, a description thereof is omitted.

When the disc recorder or reader wholly receiving the cartridge is used, the above-described disc cartridge is inserted into the disc recorder or reader in a state where the moving members 350a and 350b of the disc lock are disposed to fix the disc 10. By doing so, the recorder or reader opens a shutter and records or reads data of the read-out surface through the window 101b. To the contrary, when the disc recorder or reader receiving only the disc, the disc 10 should be ejected from the inventive disc cartridge. For this, if the moving member 350a of FIG. 7 is moved to be distant from a center of the disc 10, or the moving member 350b of FIG. 8 rotates to allow the short axis to direct the center of the disc 10, the space for allowing the ejection of the disc 10 is secured. Therefore, the user can easily separate the disc 10 from the cartridge. Of course, after the using of the disc 10 ejected from the cartridge, the disc 10 is mounted on the cartridge and then, the moving members 350a and 350b are rotated in an opposite direction of the above direction to fix the disc 10.

The disc cartridge according to the second embodiment and its modified example has an advantage in that since a portion moving to fix or unhold the disc 10 is very small, the disc cartridge has a very high rigidity.

Third Embodiment

Figure 9:
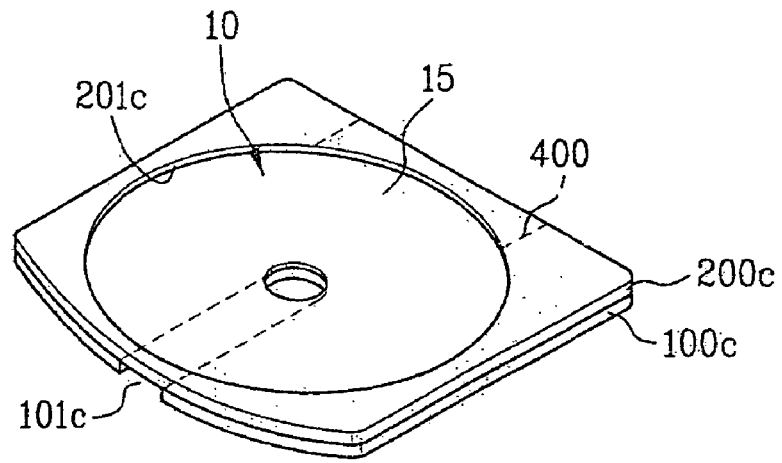
FIG. 9 is a perspective view illustrating a disc cartridge according to a third embodiment of the present invention.
Figure 10:
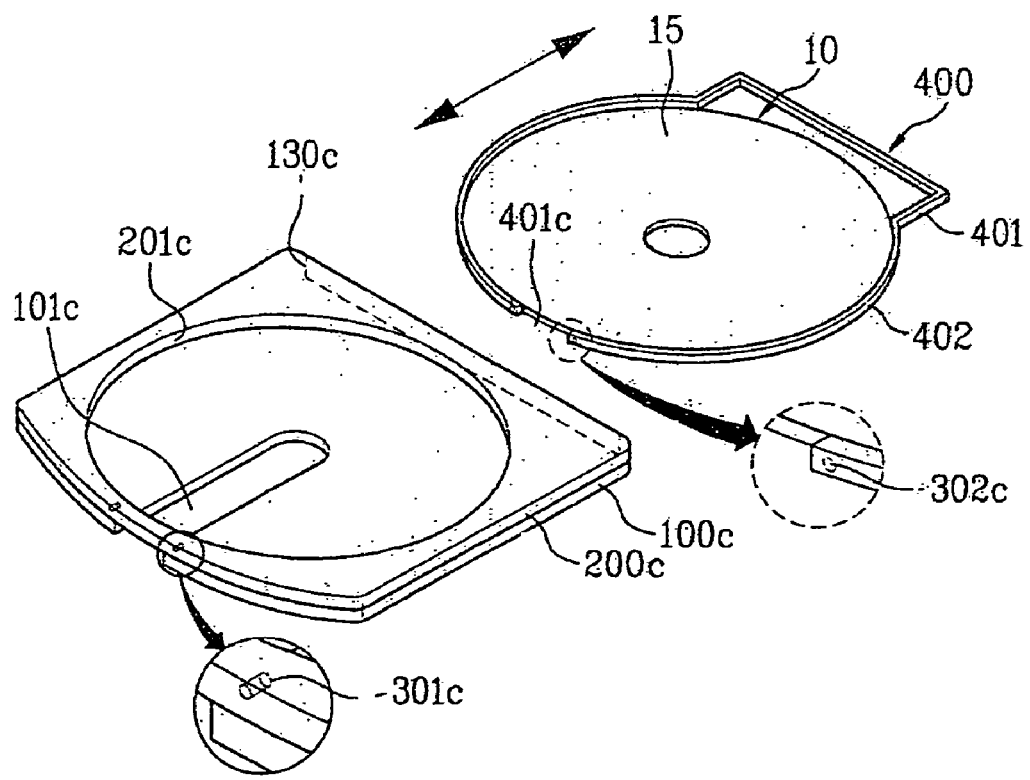
FIG. 10 is a perspective view illustrating a disc cartridge of FIG. 9 with a tray being separated.

FIG. 9 is a perspective view of a disc cartridge according to a third embodiment of the present invention, and FIG. 10 is a perspective view of a tray disassembled from the disc cartridge shown in FIG. 9. The third embodiment of the present invention will now be described with reference to FIGS. 9 and 10.

A disc cartridge according to the third embodiment of the present invention includes a lower housing 100c having a window 101c, an upper housing 200c coupled to the lower housing 100c such that a space is formed therebetween, and a disc tray 400 ejectably provided between the upper housing 200c and the lower housing 100c and on which a disc 100 is loaded. The lower housing 100c and the upper housing 200c are firmly fixed so that they are not separated from each other. The lower housing 100c and the upper housing 200c provide a space in which the disc tray 400 can be received, with the disc 10 being loaded thereon.

Referring to FIG. 10, a slot 130c is formed at one side of the assembly of the lower housing 100c and the upper housing 200c. The disc tray 400 can be inserted into or ejected from the slot 130c. The slot 130c is formed by two cut-away portions (not shown) provided at facing sides of the upper housing 200c and the lower housing 100c. Meanwhile, an opening 201c is provided at the upper housing 200c to expose a part of the label surface 15, such that the label surface 15 of the disc 10 can be easily checked. Since a size of the opening 201c is smaller than that of the disc 10, the disc 10 does not pass through the opening 201c.

The disc tray 400 includes a receiving part 402 for receiving the disc 10, and a handgrip 401 extended from the receiving part 402. The receiving part 402 is formed in a disc shape and the disc 10 is received on the receiving part 402. Also, the receiving part 402 includes a window 401c corresponding to the window 101c of the lower housing 100c, so that a disc recorder and reader can be accessed. Here, a shutter (not shown) for opening/closing the windows 101c and 401c and a rotating wheel (not shown) for rotating the shutter are installed between the receiving part 402 and the disc 10. However, parts such as a shutter latch are provided at the lower housing 100c.

Meanwhile, the handgrip 401 is horizontally extended from the side of the receiving part 402. The handgrip 401 is disposed facing the slot 130c when the receiving part 402 is completely inserted between the upper housing 200c and the lower housing 100c. Accordingly, the user can grasp the handgrip 401 and insert or eject the receiving part 402 through the slot 130c. The disc tray 400 may be completely pulled out from the cartridge or may be partially pulled out until the disc 10 can be ejected.

In this embodiment, the disc cartridge further includes a locking member that can prevent the disc tray 400 received between the upper housing 200c and the lower housing 100 from being freely pulled out. The above-described projection 301c and groove 302c are provided as the locking member. As shown in FIG. 10, the projection 301c is provided at the upper housing 200c, and the groove 302c is provided at the disc tray 400 so that it can be coupled by a snap fitting when the disc tray 400 is completely inserted between the upper housing 200c and the lower housing 100c. Of course, the projection 301c and the groove 302c may be provided at the disc tray 400 and the upper housing 200c, respectively. Further, the projection 301c and the groove 302c may be provided at the lower housing 100c and the disc tray 400, respectively. As another locking member, a press-type button or a slide-type button may be constructed with a hook and a spring, which are widely used. The disc tray 400 can be automatically locked or unlocked due to the elasticity of the spring and the operation of the hook by pressing the button.

In case where the disc cartridge according to the third embodiment of the present invention is used, if a disc recorder or reader entirely receiving the cartridge is used, the cartridge is entirely inserted into the recorder or reader in a state that the disc tray 400 is fixed inside the cartridge, as shown in FIG. 9. Then, the recorder or reader opens the shutter and records or reads out data on or from the read-out surface of the disc 10 through the windows 101c and 401c. On the contrary, when a disc recorder or reader receiving only the disc is used, the disc 10 must be ejected from the disc cartridge according to the present invention. For this purpose, the user grasps the handgrip 401 of the disc tray 400 through the slot 130c and ejects the disc tray 400 out of the cartridge. After using the disc 10 loaded on the disc tray 400 ejected from the cartridge, the disc 10 is again loaded on the disc tray 400 and the disc tray 400 is pushed into the cartridge through the slot 130c in a direction opposite to the above direction. If so, the projection 301c is inserted into and fixed to the groove 302c by the snap fitting, such that the disc 10 is stably received inside the cartridge.

Fourth Embodiment

Figure 11:
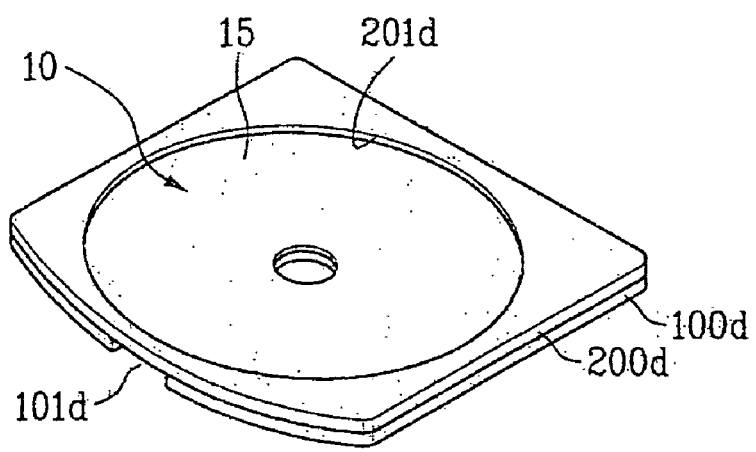
FIG. 11 is a perspective view illustrating a disc cartridge according to a fourth embodiment of the present invention.
Figure 12A:
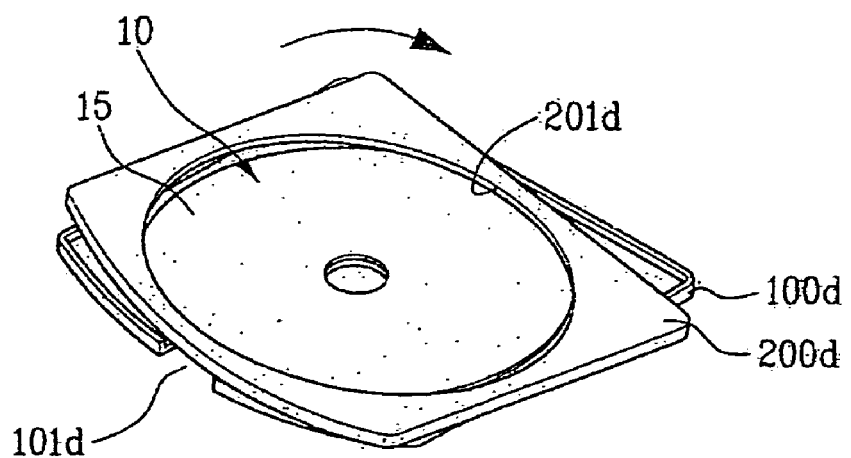
FIGS. 12A and 12B are perspective views illustrating a separation procedure of a disc cartridge of FIG. 11.
Figure 12B:
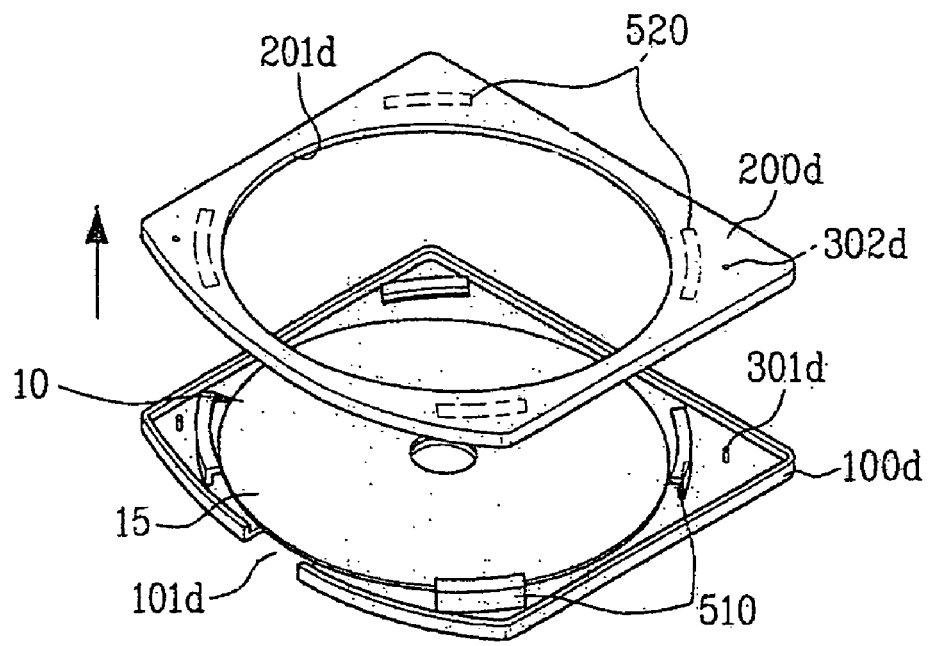
Figure 12C:
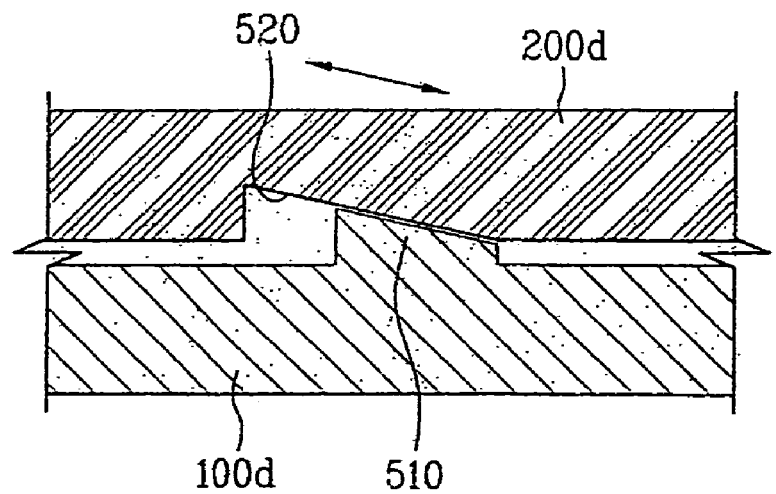
FIG. 12C is a partial sectional view illustrating a coupling projection and a coupling groove of a disc cartridge of FIG. 11.

FIG. 11 is a perspective view of a disc cartridge according to a fourth embodiment of the present invention. FIGS. 12A and 12B are perspective views illustrating a process of disassembling the disc cartridge of FIG. 11, and FIG. 12C is a partial sectional view of a coupling projection and a coupling groove shown in FIG. 11. The disc cartridge according to the fourth embodiment of the present invention will now be described with FIGS. 11 and 12A to 12C.

The disc cartridge according to the fourth embodiment of the present invention includes an upper housing 200d and a lower housing 100d. The upper and lower housings 200d and 100d are separably coupled through a coupling member. First, the lower housing 100d includes a window 101d that will be accessed by the disc recorder or reader. The upper housing 200d is coupled with the lower housing 100d so that the disc 10 can be received therebetween. The upper housing 200d includes an opening 201d exposing a part of a label surface 15, so that the user can easily check the label surface 15 of the disc 10. Since a size of the opening 201d is smaller than that of the disc 10, the disc 10 cannot pass through the opening 201d. However, the present invention is not limited to it. The opening 201d may not be provided at the housing 200d such that the upper housing 200d completely covers the label surface 15 of the disc 10.

While moving in a horizontal direction, for example, rotating in a horizontal direction as shown in FIGS. 12A and 12B, the upper housing 200d is coupled to or separated from the lower housing 100d. For this purpose, the upper housing 200d and the lower housing 100d are separably coupled together through the coupling member. As shown in FIG. 12B, the coupling member includes a coupling projection 510 and a coupling groove 520.

The coupling projection 510 is protruded from an upper surface of the lower housing 100d toward the upper housing 200d. The coupling groove 520 is formed at a lower surface of the upper housing 200d, corresponding to the coupling groove 520. Also, the coupling projection 510 and the coupling groove 520 may be provided at the upper housing 200d and the lower housing 100d, respectively. Referring to FIG. 12B, it is preferable that a plurality of coupling projection 510 and a plurality of coupling groove 520 are arranged along a periphery of the disc 10 so that they cannot be interfered with the disc 10.

As shown in FIG. 12B, the coupling projection 510 and the coupling groove 520 are formed in a curved shape having the same curvature as the a circumference of the disc 10, so that the upper housing 200d can be coupled to or separated from the lower housing 100d while rotating in a horizontal direction with respect to the lower housing 100d.

Meanwhile, the coupling member is not limited to the above-described embodiment. The upper housing 200d may be coupled to or separated from the lower housing 100d, while sliding in a horizontal direction with respect to the lower housing 100d. For example, if the coupling projection 510 and the coupling groove 520 are formed in a shape of a straight line, the upper housing 200d can be coupled to or separated from the lower housing 100d, while sliding along a length direction of the coupling projection 510 and the coupling groove 520 with respect to the lower housing 100d.

In this embodiment, it is preferable that the upper housing 200d and the lower housing 100d are naturally coupled to or separated from each other when the upper housing 200d rotates or slides in a horizontal direction with respect to the lower housing 100d. For this purpose, as shown in FIG. 12C, the coupling projection 510 and the coupling groove 520 have inclined surfaces, along which they slide and come into contact with each other. In more detail, an upper end portion of the coupling projection 510 is inclined along its length direction, and a bottom surface of the coupling groove 520 is also inclined along its length direction.

In case where the coupling projection 510 and the coupling groove 520 are constructed as above, when the upper housing 200d is horizontally rotated with respect to the lower housing 100d so as to couple the upper housing 200d and the lower housing 100d, the upper housing 200d moves slightly and vertically toward the lower housing 100d. Thus, while approaching the lower housing 100d, the upper housing 200d is naturally coupled to the lower housing 100d. Also, when the upper housing 200d is horizontally rotated with respect to the lower housing 100d so as to separate the upper housing 200d and the lower housing 100d, the upper housing 200d moves vertically and slightly toward a side opposite to the lower housing 100d. Thus, while going away from the lower housing 100d, the upper housing 200d is naturally separated from the lower housing 100d. Therefore, it is unnecessary to strongly push the upper housing 200d in a vertical direction with respect to the lower housing 100d so as to couple or separate the upper housing 200d and the lower housing 100d.

A locking member is provided at the upper housing 200d and the lower housing 100d so that they cannot be naturally opened until the user releases the coupled state of the upper housing 200d and the lower housing 100d. The locking member includes a projection 301d and a groove 302d, which are formed adjacent to the disc 10. For example, as shown in FIG. 12B, the projection 301d is protruded on the upper surface of the lower housing 100d, and the groove 302d is protruded on a lower surface of the lower surface of the upper housing 200d, corresponding to the projection 301d. Accordingly, when the upper housing 200d is coupled with the lower housing 100d, the projection 301d is fitted and fixed to the groove 302d by a snap fitting. The coupled upper and lower housings 200d and 100d are not released with ease.

Meanwhile, although not shown, a female thread is formed at one side of the upper housing 200d, for example, an inner periphery. A male thread corresponding to the female thread is formed at one side of the lower housing 100d, for example, an outer periphery. In this manner, the upper housing 200d and the lower housing 100d can be coupled with or separated from each other. In this case, if the male thread is coupled to the female thread, the housings are naturally in a locked state. If the male thread is separated from the female thread, the housings are naturally in an unlocked state. Thus, an additional locking member is not required. Meanwhile, a female thread or male thread is formed at an outer circumference or an inner circumference of the coupling projection 510 shown in FIG. 12B, and a projection similar to the coupling projection 510 is formed at a position corresponding to the coupling groove 520 shown in FIG. 12B. Then, the female thread or the male thread is formed on the projection. By doing so, the above-described effect can be obtained.

Also, although not shown, the same effect as the embodiments of the present invention can also be obtained without an additional locking member by providing the coupling member of the present invention with a locking button and a coupling projection. Here, the locking button includes a coupling piece formed at one side of the upper housing 200d or the lower housing 100d, and the coupling projection is detachably coupled to the coupling piece of the locking button at a corresponding portion. Further, even when a projection is formed in an L shape like the coupling projection 510 at a position corresponding to the coupling groove 520 of FIG. 12B, it can function as the coupling member. In this case, if the upper housing 200d is rotated such that a horizontal portion of the coupling projection 510 is engaged with a horizontal portion of the projection, the upper housing 200d and the lower housing 100d are fixed in a coupled state. If the upper housing 200d is rotated until the horizontal portion of the coupling projection 510 is not engaged with the horizontal portion of the projection, the upper housing 200d and the lower housing 100d are separated from each other.

In case where the disc cartridge according to the fourth embodiment of the present invention is used, if a disc recorder or reader entirely receiving the cartridge is used, the cartridge is entirely inserted into the recorder or reader in a state that the upper housing 200d and the lower housing 100d are fixed, as shown in FIG. 11. Then, the disc recorder or reader opens the shutter and records or reads out data on or from the read-out surface of the disc 10 through the window 101d. On the contrary, when a disc recorder or reader receiving only the disc is used, the disc 10 must be separated from the disc cartridge according to the present invention. For this purpose, if the upper housing 200d is rotated in a horizontal direction, the coupling projection 510 is released from the coupling groove 520. Thus, the upper housing 200d and the lower housing 100d are naturally separated from each other. After the disc 10 unloaded from the cartridge is used, the disc 10 is again loaded on the disc cartridge and the upper housing 200d is rotated in a direction opposite to the above horizontal direction. If so, while the upper housing 200d and the lower housing 100d are coupled together, the projection 301d is inserted into and fixed to the groove 302d by the snap fitting, such that the disc 10 is stably received inside the cartridge.

As described above, the disc cartridge according to the present invention can be easily opened or closed. Thus, the disc can be easily separated from the cartridge or loaded into the cartridge. Therefore, the disc cartridge can be applied to both the disc recorder and reader entirely receiving the disc cartridge and the disc recorder and reader receiving only the disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A disc cartridge comprising:
   a lower housing having a window for allowing a recorder or reader to access to a read-out surface of a disc;
   an upper housing coupled to the lower housing to ejectably receive the disc between the lower housing and the upper housing, and having at least a portion rotatable up and down with respect to one side of the lower housing until the disc can be ejected; and
   a locking assembly mounted on the lower housing and the upper housing, the locking assembly including at least one pair of projection and groove,
   wherein the projection is maintained and fixed into the groove by snap fitting the projection into the groove and is substantially surrounded by the groove when the upper housing is coupled with the lower housing, wherein, when the upper housing is coupled with the lower housing, the projection is protruded vertically and the groove is recessed vertically with respect to a surface of the disc cartridge on which the disc is placed, wherein the upper housing and the lower housing are integrally formed as one piece, wherein the upper housing has an opening to expose a portion of a surface of the disc, and the opening has a size that prevents an ejection of the disc through the opening, and wherein the portion of the surface of the disc is a portion of a label surface of the disc.

2. The disc cartridge of claim 1, wherein the upper housing is integrally formed, and is wholly rotated up and down centering on one side of the lower housing.

3. The disc cartridge of claim 2, wherein the upper housing is formed integrally with the lower housing, and the upper housing and the lower housing are connected via a connection portion at one side, the connection portion including a flexible hinge configured to be folded or unfolded.

4. The disc cartridge of claim 2, wherein the upper housing is hinge-coupled to the one side of the lower housing.

5. The disc cartridge of claim 1, wherein a shape of the opening corresponds to a shape of the disc, and the size of the opening is smaller than a size of the disc.

6. The disc cartridge of claim 1, wherein the upper housing and the lower housing are connected via a living hinge.

7. A disc cartridge, comprising:
a lower housing for accommodating a disk;
an upper housing connected to one side of the lower housing and being capable of rotating to be opened and closed; and
a locking assembly mounted on the lower housing and the upper housing, the locking assembly including at least one pair of projection and groove,
wherein the projection is maintained and fixed into the groove by snap fitting the projection into the groove and is substantially surrounded by the groove when the upper housing is coupled with the lower housing,
wherein, when the upper housing is coupled with the lower housing, the projection is protruded vertically and the groove is recessed vertically with respect to a surface of the disc cartridge on which the disc is placed,
wherein the upper housing has an opening having a size sufficient to expose a portion of a surface of the disc and to prevent the disc from escaping through the opening,
wherein the upper housing and the lower housing are integrally formed as one piece,
wherein a shape of the opening corresponds to a shape of the disc, and the size of the opening is smaller than a size of the disc.

8. The disc cartridge of claim 7, further comprising a connection portion including a flexible hinge, wherein the lower housing is flexibly and integrally connected to the upper housing at its one side via the connection portion.

9. The disc cartridge of claim 7, wherein the locking assembly comprises at least a pair of projection and groove, and the projection and the groove are mounted on the upper housing and the lower housing to interact with each other.

10. The disc cartridge of claim 9, wherein the projection and the groove are formed on a peripheral side of the lower housing or the upper housing.

11. The disc cartridge of claim 7, wherein the lower housing includes an opening through which the disc is accessed by a disc reader/recorder.

12. The disc cartridge of claim 7, wherein the upper housing and the lower housing are connected via a living hinge.

13. A disc cartridge, comprising:
a lower housing having a window for allowing a recorder or reader to access to a read-out surface of a disc;
an upper housing coupled to the lower housing to ejectably receive the disc between the lower housing and the upper housing, and having at least a rotation portion rotatable up and down with respect to one side of the lower housing until the disc can be ejected; and
a locking assembly mounted on the lower housing and the upper housing, the locking assembly including at least one pair of projection and groove,
wherein the projection is maintained and fixed into the groove by snap fitting the projection into the groove and is substantially surrounded by the groove when the upper housing is coupled with the lower housing, and
wherein, when the upper housing is coupled with the lower housing, the projection is protruded vertically and the groove is recessed vertically with respect to a surface of the disc cartridge on which the disc is placed,
wherein the upper housing has an opening to expose a portion of a surface of the disc, and the opening has a size that prevents an ejection of the disc through the opening, and
wherein an outer edge of the rotation portion of the upper housing and an outer edge of the lower housing are substantially the same in shape such that the outer edge of the rotation portion corresponds with the outer edge of the lower housing,
wherein a shape of the opening corresponds to a shape of the disc, and the size of the opening is smaller than a size of the disc.

14. A disc cartridge, comprising:
a lower housing for accommodating a disk;
an upper housing connected to one side of the lower housing and being capable of rotating to be opened and closed; and
a locking assembly mounted on the lower housing and the upper housing,
wherein the upper housing has an opening having a size sufficient to expose a portion of a surface of the disc and to prevent the disc from escaping through the opening,
wherein the locking assembly comprises at least one pair of projection and groove,
wherein the projection is maintained and fixed into the groove by snap fitting the projection into the groove and is substantially completely surrounded by the groove when the upper housing is coupled with the lower housing, and
wherein, when the upper housing is coupled with the lower housing, the projection is protruded vertically and the groove is recessed vertically with respect to a surface of the disc cartridge on which the disc is placed,
wherein a shape of the opening corresponds to a shape of the disc, and the size of the opening is smaller than a size of the disc.

* * * * *